May 6, 1958  J. A. MAIN  2,833,378
BRAKE WITH PIVOTED MOTOR
Filed Dec. 18, 1953  4 Sheets-Sheet 1

INVENTOR.
JOHN A. MAIN.
BY
Whittemore Hulbert Belknap.

May 6, 1958     J. A. MAIN     2,833,378
BRAKE WITH PIVOTED MOTOR

Filed Dec. 18, 1953     4 Sheets-Sheet 2

INVENTOR.
JOHN A. MAIN.
BY

May 6, 1958   J. A. MAIN   2,833,378
BRAKE WITH PIVOTED MOTOR
Filed Dec. 18, 1953   4 Sheets-Sheet 3

INVENTOR.
JOHN A. MAIN.
BY
Whittemore Hulbert & Belknap

May 6, 1958  J. A. MAIN  2,833,378
BRAKE WITH PIVOTED MOTOR
Filed Dec. 18, 1953  4 Sheets-Sheet 4

INVENTOR.
JOHN A. MAIN.
BY

United States Patent Office 2,833,378
Patented May 6, 1958

2,833,378

BRAKE WITH PIVOTED MOTOR

John A. Main, Birmingham, Mich., assignor to Kelsey-Hayes Company, a corporation of Delaware Application December 18, 1953, Serial No. 398,923

11 Claims. (Cl. 188—78)

The invention relates to brakes and refers more particularly to vehicle wheel brakes of the type employing internal brakes shoes.

The invention has for one of its objects the provision of an improved brake having a friction device movable against a brake drum by actuating means which is operable to initially spread apart separable ends of the friction device and move the friction device against the drum and to then transmit thrust from one of the separable ends to the other to thereby secure a powerful brake requiring relatively low operating pressure.

The invention has for another object to provide an improved brake in which the actuating means comprises a fluid pressure actuated device having abutments for initially applying the friction device and other abutments for transmitting thrust from one portion of the friction device to another portion.

The invention has for a further object to provide an improved brake enabling the use of a brake drum of relatively small diameter.

These and other objects will become apparent from the following description taken in connection with the accompanying drawings in which—

Figure 1 is a side elevation partly broken away and in section of a brake embodying the invention;

Figures 2, 3 and 4 are cross sections on the lines 2—2, 3—3 and 4—4, respectively of Figure 1;

Figure 7:
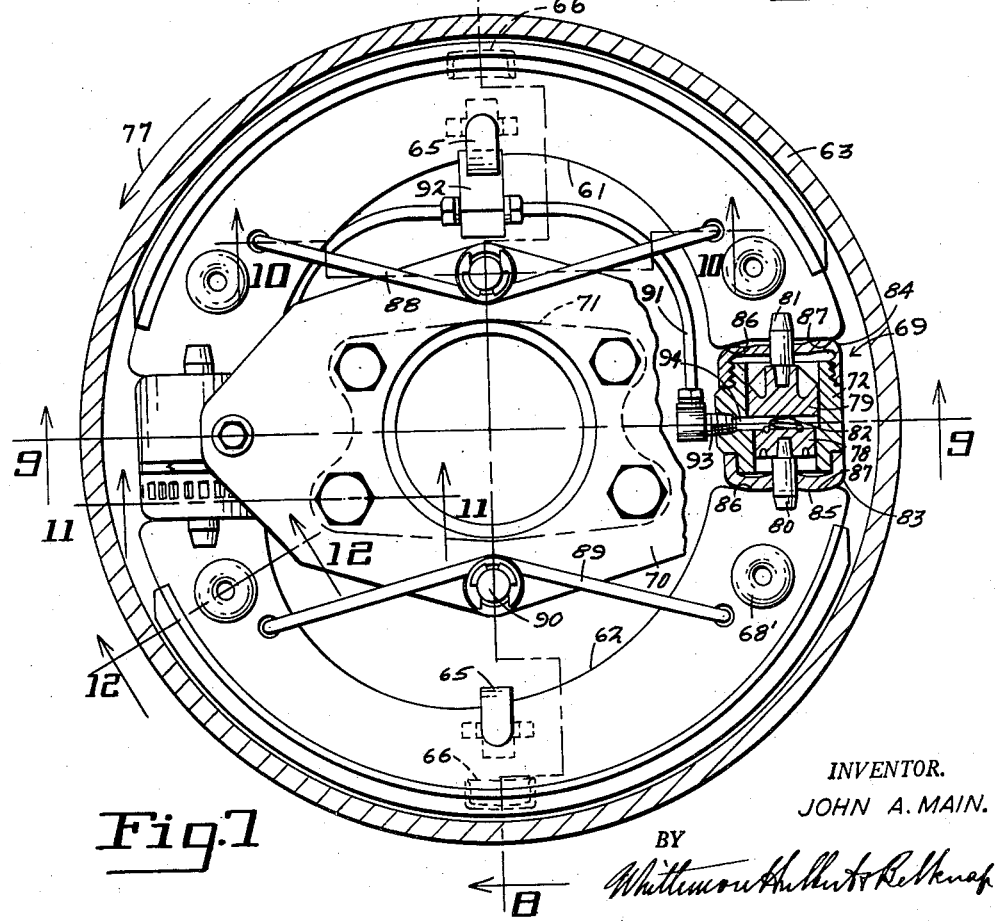
Figure 7 is a view similar to Figure 1 showing another modification.
Figure 8:
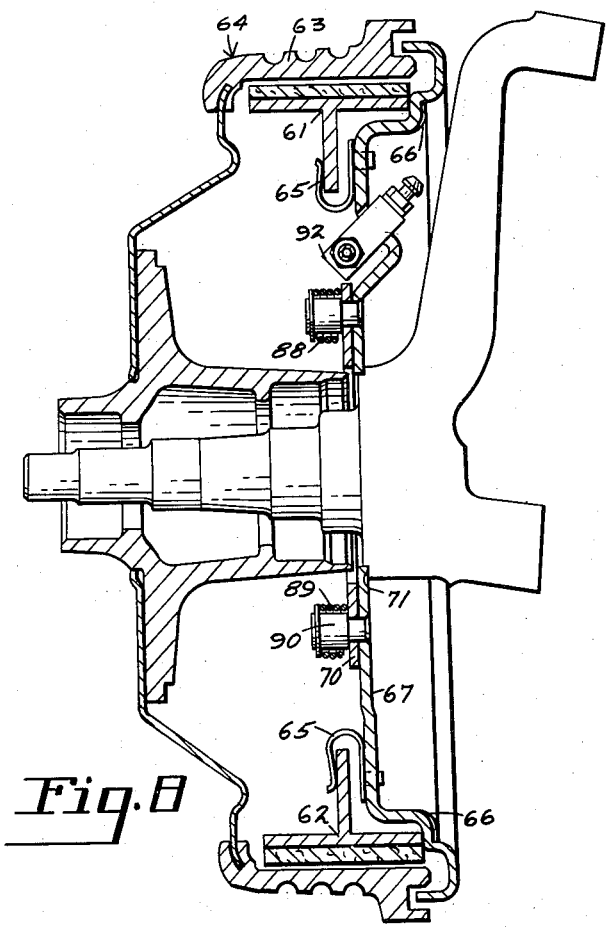
Figures 11, 12:
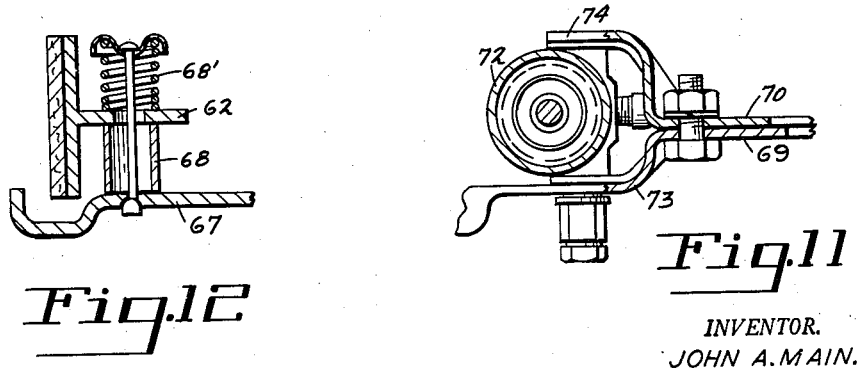

Figures 8, 9, 10, 11 and 12 are cross sections on the lines 8—8, 9—9, 10—10, 11—11 and 12—12, respectively, of Figure 7.

Figure 1:
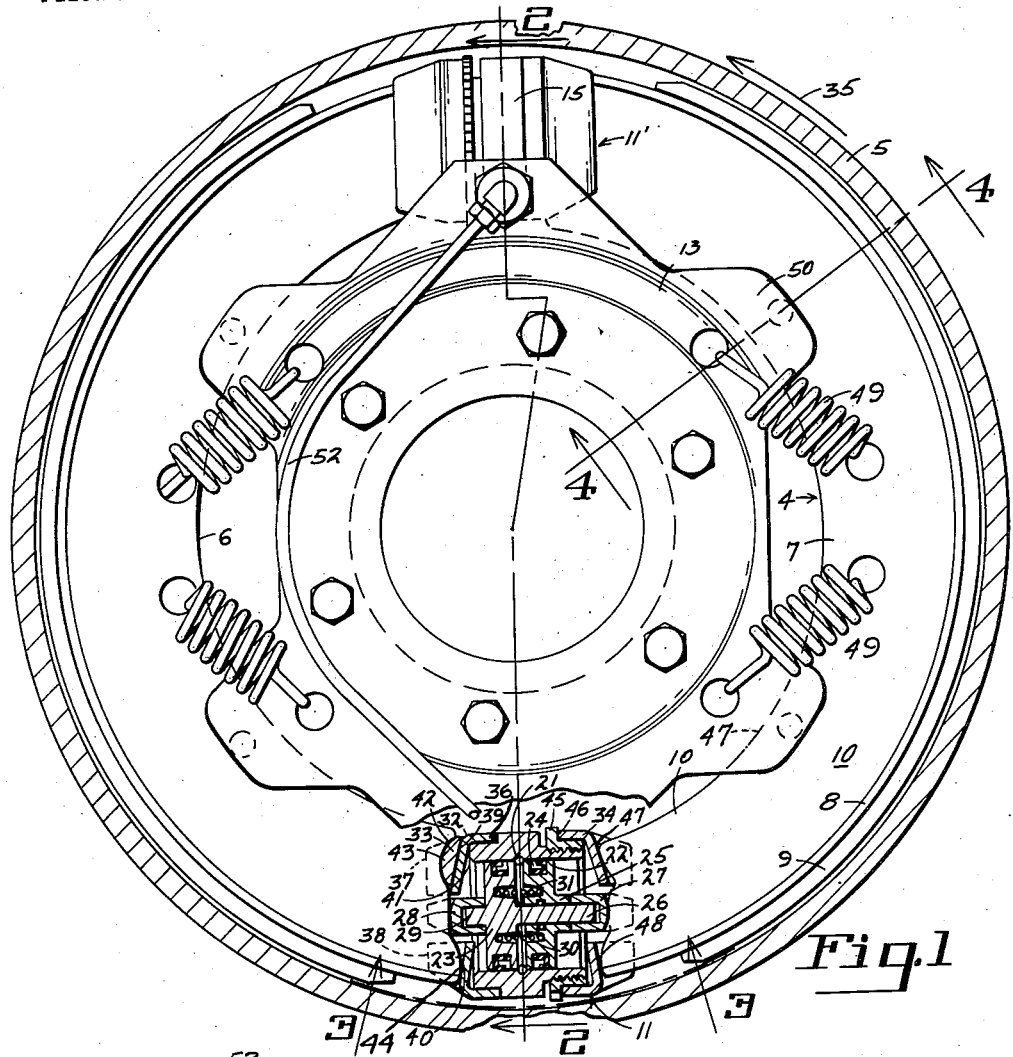
Figures 3, 5:
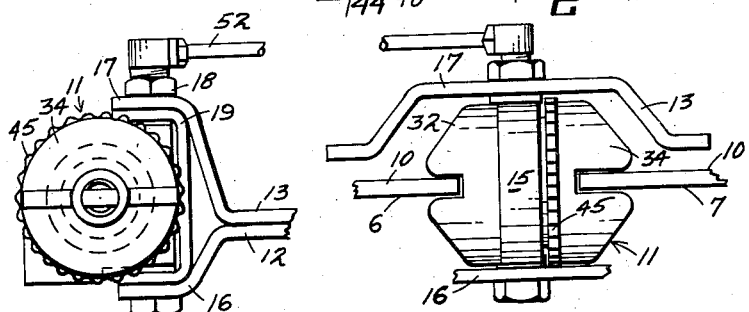
Figure 5 is a right-hand end view of Figure 3 with the brake shoe omitted.
Figure 2:
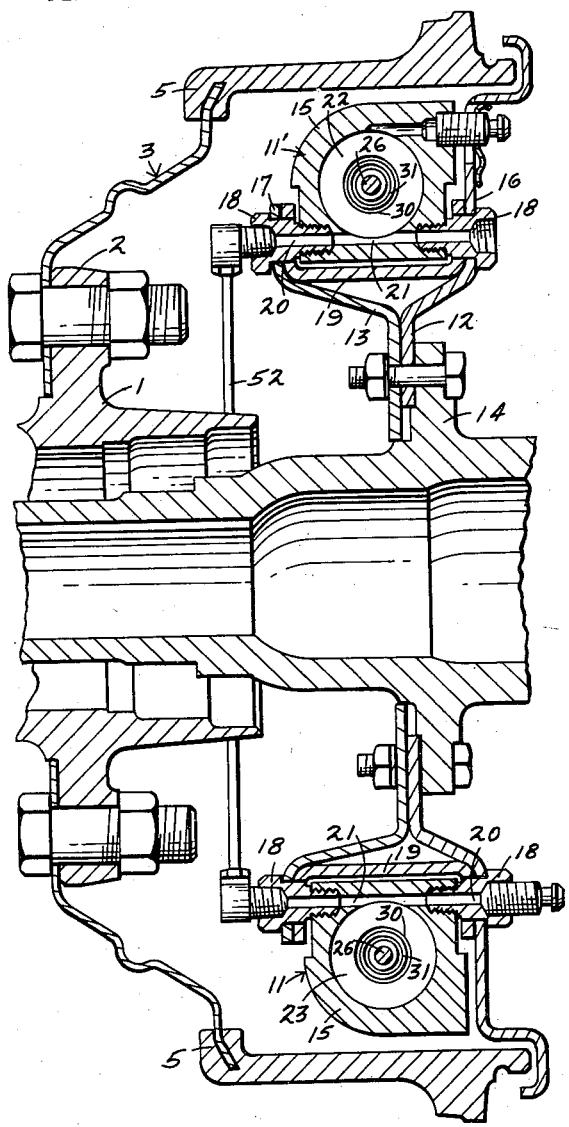

The brakes illustrated in the present instance are designed for use with vehicle wheels and more particularly motor vehicle wheels which, as shown in Figures 1 and 2 particularly, have the hub 1 provided with the fixed radial flange 2 to which the wheel body is detachably secured.

The brake, as illustrated in Figures 1 to 5, inclusive, comprises the brake drum 3 permanently mounted upon the fixed radial flange 2 and the friction device 4 within the drum and engageable with the radially inner surface of its annular brake flange 5. The friction device comproses the pair of brake shoes 6 and 7, which are alike, each brake shoe being of T-cross section and having the arcuate flange or rim 8, the brake lining 9 secured to the rim and the radial flange or web 10 extending radially inwardly from the rim. The shoes have separable spaced adjacent ends between which are located the lower and upper fluid pressure actuated devices 11 and 11', respectively, each of which is designed to initially spread apart the ends and then to transmit thrust from one end to the adjacent end.

The fluid pressure actuated devices 11 and 11' are wheel cylinders pivotally mounted on a mounting comprising the backing plate 12 and the associated plate 13, both of these plates being fixedly secured to the fixed radial flange 14 of the rear axle housing of the motor vehicle. Each wheel cylinder has the cylinder 15 located between the spaced portions 16 and 17 of the plates and pivotally mounted on these spaced portions by the axially aligned gudgeons 18 which extend through and are journalled in the spaced portions and threadedly engage the cylinder. A channel-shaped reinforcing member 19 is provided between the spaced portions 16 and 17 and its flanges form additional bearings for the gudgeons. The gudgeons are provided with the axial passages 20 for the braking liquid, and these passages register with the passage 21 in the cylinder 15 communicating with its interior. Each wheel cylinder also has the pistons 22 and 23 slidable in the cylinder 15 with a suitable sealing ring 24 between each piston and the cylinder wall. The pistons are formed to guide each other, the piston 22 having the hub 25 and the piston 23 having the stem 26 slidable within the hub. 27 is an abutment between the end of the web 10 of the shoe 7 and the adjacent end of the hub 25, this abutment being slidably sleeved over the stem 26. 28 is a second abutment between the adjacent end of the web 10 of the shoe 6 and the piston 23, this abutment being sleeved over a second stem 29 extending from the piston 23 at the side opposite the stem 26 and in axial alignment therewith. The abutments 27 and 28 are alike, each having furcations embracing the webs of the shoes and rounded bottoms abutting the central portions of the ends of the webs. The pistons are formed with the axially aligned annular grooves 30 in which is located the coil spring 31 for exerting spreading apart force on the pistons holding their abutments against the adjacent ends of the webs of the shoes.

For the purpose of transmitting thrust, which results from the engagement of the brake shoes with the brake drum, from each of the shoes to the other, the wheel cylinders are provided with other abutments rockable with the wheel cylinders and engageable with bearings at the ends of the shoe webs, the arrangement of abutments and bearings being such that a part only of the thrust is transmitted from one shoe to the other shoe. The arrangement of these abutments is the same for both wheel cylinders, one abutment being formed of the cap 32 and the pad 33 and the other abutment being formed of the cap 34. Assuming that during forward movement of the motor vehicle the brake drum is rotating in a counterclockwise direction, as indicated by the arrow 35 in Figure 1, the caps 32 and the pads 33 are located at the ends of the wheel cylinders to engage the trailing ends of the shoes and the caps 34 are located at the other ends of the wheel cylinders to engage the leading ends of the shoes. Each cap 32 is sleeved over the cylinder 15 and abuts the annular shoulder 36 formed by a central enlarged portion of the cylinder. The top of the cap is centrally apertured to provide for the passage therethrough of the abutment 28 and the top has the aligned radially inner and radially outer depressions 37 and 38, respectively, for receiving the end of the web 10 of the shoe 6. The bottom 39 of the depression 37 and the bottom 40 of the depression 38 are inclined from their radially outer ends toward the radial plane of the brake passing through the pivot of the wheel cylinder. The pad 33 is located in the depression 37 and is slidable on its bottom 39 and the center of curvature 41 of the arcuate convex outer surface 42 of the pad is located inside the cylinder 15. The trailing end of the web 10 of the shoe 6 is formed with the radially inner bearing 43 and the radially outer bearing 44, the bearing 43 fitting the arcuate convex surface 42 of the pad 33, and the bearing 44 being convex and engaging the bottom 40 of the depression 38 in the retracted position of the parts. Each cap 34 is formed in the same manner as the cap 32 and is sleeved over the adjusting wheel 45 and abuts the annualr shoulder 46 formed by a radial flange of the adjusting wheel. The adjusting wheel is adjustably threaded on the cylinder 15, the arrangement providing for taking up wear of the linings. The leading end of the web 10 of each of the shoes 6 and 7 is formed with the radially inner convex bearing 47 and the radially outer convex bearing 48 for engaging the bottoms of the depressions in the top of the cap 34 in the retracted position of the parts. The arrangement of the radially inner bearings 43 and 47 and their abutments is such that upon operation of the brake the lines of force are in a direction passing radially outwardly of the axis of the pivot for the wheel cylinder so that the wheel cylinder is rocked by the shoes. Also the radially outer bearings of the shoes and their abutments are so arranged with respect to the radially inner bearings of the shoes and their abutments that there is a relatively small leverage ratio providing for transmitting a relatively small part of the thrust from one shoe to the other in either direction of rotation of the drum.

The shoes are normally held in retracted position by the pairs of coil springs 49 connected to the shoes near their centers and to the portions 50 of the plate 13 which cooperate with the portions 51 of the backing plate 12 to guide the webs of the shoes.

The wheel cylinders 11 and 11' are connected together by the tubing 52 which is connected to the gudgeons 18 at the axially outer sides of the wheel cylinders. The gudgeon 18 at the axially inner side of the upper wheel cylinder 11' is adapted to be connected by suitable tubing to a suitable source of braking fluid under pressure, such as a master cylinder. The gudgeon 18 at the axially inner side of the lower wheel cylinder 11 is closed by a standard construction of bleed valve as is also the bleed passage in the upper wheel cylinder.

In operation, upon passage of braking fluid under pressure into the cylinders 15 of both wheel cylinders, the ends of the shoes 6 and 7 will be spread apart and against the brake flange 5 of the drum. With the drum rotating in a counterclockwise direction, as shown by the arrow 35 in Figure 1, the shoes wrap into engagement with the brake flange and move in a counterclockwise direction with the brake flange and their radially inner bearings 43, acting through the pads 33 and the bottoms 39 of the depressions 37 of the caps 32, rock the wheel cylinders in a counterclockwise direction about their pivots formed by the gudgeons 18. As a result, the bottoms of the radially outer depressions of the caps 34 act upon the bearings 48, with the result that a part of the thrust of the shoes is transmitted from the trailing ends to the leading ends of the shoes. During the rocking of the wheel cylinders, force resulting from torque, continues to be added until the wheel cylinders can no longer swing about the axes of their pivots, at which time the wheel cylinders acting through their pivots and cooperating with the drum and shoes serve to anchor the shoes.

Figure 6:
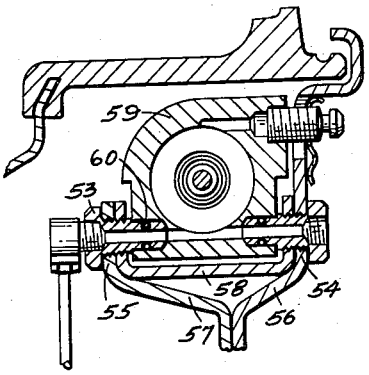
Figure 6 is a view similar to a portion of Figure 2 showing a modification.
Figure 4:
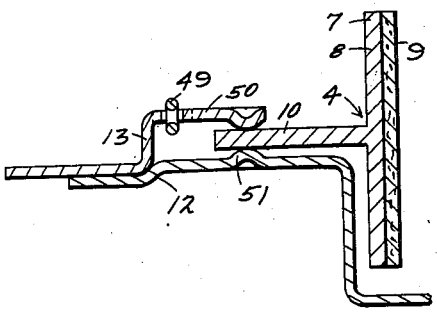
Figure 9:
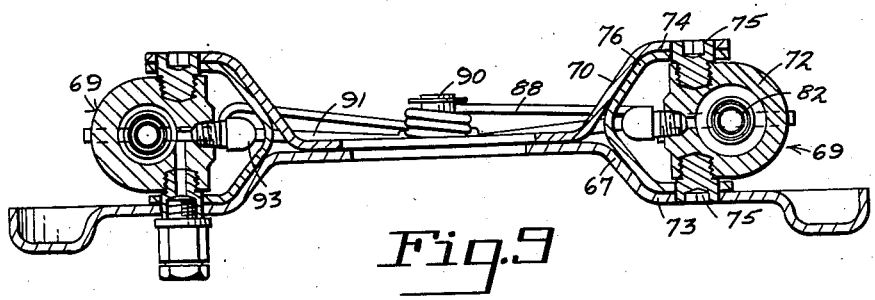
Figure 10:
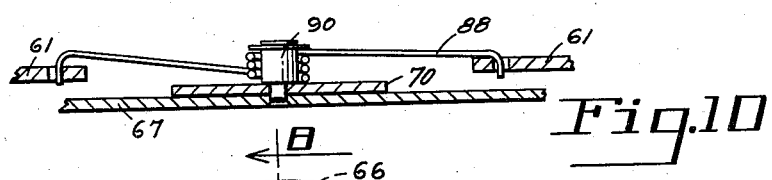

Figure 6 illustrates a modification of the pivotal mounting for a wheel cylinder in which the gudgeons 53 are threaded into the spaced portions 54 and 55 of the backing plate 56 and associated plate 57, and are also threaded into the flanges of the channel-shaped reinforcing member 58. The cylinder 59 of the wheel cylinder receives and is journalled on the gudgeons, suitable sealing means, such as the O-rings 60, being provided to prevent escape of the braking liquid.

In the modification illustrated in Figures 7 to 12, inclusive, 61 and 62 are the upper and lower brake shoes forming the friction device and engageable with the annular brake flange 63 of the brake drum 64. These shoes are alike and are of T-cross section with the webs guided at their centers by the spring clips 65 and the embossed pads 66 of the backing plate 67. The webs are also guided between their ends and the spring clips by the spacers 68 against which the webs are held by the resilient hold-down devices 68'. For initially forcing the shoes against the brake flange, and then transmitting part of the thrust of one shoe to the other, there are the wheel cylinders 69 located between the adjacent ends of the shoes. These wheel cylinders are pivotally mounted upon the backing plate 67 and the associated plate 70, which are fixedly mounted on the flange 71 of a steering knuckle of a motor vehicle as shown for a front brake or on the flange of the axle housing of a motor vehicle for a rear brake (not shown). Each wheel cylinder has the cylinder 72 located between the spaced portions 73 and 74 of the plates and pivotally mounted on these spaced portions by the axially aligned gudgeons 75 which extend through and are journalled in the spaced portions and threadedly engage the cylinder. A channel-shaped reinforcing member 76 is provided between the spaced portions and its flanges form additional bearings for the gudgeons. Each cylinder 72 has its end portions formed of different diameters, the larger diameter bore opening in the direction of rotation of the drum during forward movement of the motor vehicle, as indicated by the arrow 77 in Figure 7. 78 and 79 are the smaller and larger pistons slidable within the smaller and larger bores of the cylinder and these pistons are provided with the abutments 80 and 81, respectively, in the nature of pins, having furcations embracing the central portions of the ends of the adjacent shoe webs with bottoms at the inner ends of the furcations abutting the central portions. The pistons are resiliently spread apart by means of the coil spring 82 which serves to hold the bottoms of the abutment pins against the ends of the shoe webs. 83 and 84 are other abutments for transmitting thrust from one shoe to the other shoe. These other abutments are sheet metal caps having the annular ridge portions 85 for abutting the radially inner bearings 86 and the radially outer bearings 87 upon the ends of the webs of the shoes, the radially inner bearings extending over the ridge portions.

For normally holding the shoes in retracted position, I have provided the upper and lower springs 88 and 89, respectively. These springs are formed of round stock and have their ends engaging the end portions of the shoes and their centers coiled around the studs 90, which are secured to the backing plate 67 and the associated plate 70. The springs serve to hold the ends of the shoe webs against the abutment caps.

91 is suitable tubing leading from the bleed valve fitting 92 on the backing plate 67 to the nipples 93 secured in the cylinders 72. The nipples communicate with the passages 94 leading to the space between the smaller and larger pistons 78 and 79. One of the inboard gudgeons 75, which extends through the backing plate 67 is adapted to be connected to a suitable source of braking liquid under pressure.

In operation, assuming the brake drum to be rotating in a counterclockwise direction, as indicated by the arrow 77 in Figure 7, it will be seen that when the braking liquid under pressure is forced into the wheel cylinders, the smaller and larger pistons will first be separated to urge the shoes against the drum, the larger piston acting on the leading ends of the shoes. Then the radially inner bearings 86 at the trailing ends of the shoes, acting upon the abutments 83, rock or swing the wheel cylinders at which time the abutments 84 act upon the radially outer bearings 87 of the leading ends of the shoes thereby transmitting a part of the thrust from one shoe to the other shoe. It will be noted that the axes of the gudgeons intersect the larger bores of the cylinders closely adjacent their radially inner peripheries so that the ratio of the leverages for transmitting thrust from one shoe to the other shoe is relatively small. The adding of force, resulting from torque, continues until the wheel cylinders can no longer rock or swing about the axes of their pivots, at which time the wheel cylinders and their pivots serve to anchor the brake shoes.

What I claim my invention is:

1. A brake comprising a brake drum, brake shoes within and engageable with said drum and having adjacent ends, said shoes being movable circumferentially by said drum, and means for moving said shoes against said drum including a wheel cylinder extending between said adjacent ends of said shoes, means rockably supporting said wheel cylinder, said wheel cylinder being provided with relatively movable abutments operable by fluid under pressure to engage and spread apart said adjacent shoe ends to engage said shoes with said drum, and said wheel cylinder being provided with other abutments rockable with said wheel cylinder and engaging and transmitting thrust from one of said adjacent shoe ends to the other of said adjacent shoe ends.

2. A brake comprising a brake drum, a mounting, a pair of brake shoes within and engageable with said drum, said shoes being movable circumferentially by said drum, wheel cylinders between adjacent ends of said shoes pivotally mounted on said mounting, each of said wheel cylinders having relatively movable abutments engaging adjacent shoe ends for moving said shoes against said drum and having other abutments engaging adjacent shoe ends for transmitting thrust from one of the adjacent shoe ends to the other of the adjacent shoe ends.

3. A brake comprising a brake drum, a mounting, a pair of brake shoes within and engageable with said drum, said shoes being movable circumferentially by said drum, wheel cylinders having relatively movable abutments engaging adjacent ends of said shoes for moving said shoes against said drum and also having other abutments engaging the adjacent ends for transmitting thrust from one adjacent end to the other, said wheel cylinders being pivotally mounted on said mounting radially inwardly of the lines of force through the points of engagement of said other abutments with said adjacent ends.

4. A brake comprising a brake drum, a mounting, a friction device within and engageable with said drum and having adjacent ends, said friction device being movable circumferentially by said drum, means for moving said friction device against said drum including a wheel cylinder rockably mounted on said mounting and having relatively movable abutments for engaging and spreading said ends apart to engage said friction device with said drum, said wheel cylinder forming a rigid lever extending between and having abutments engageable with said ends for transmitting force from one of said ends to the other of said ends and for cooperating with said drum and friction device to anchor said friction device.

5. A brake comprising a brake drum, a friction device within and engageable with said drum and having adjacent ends, said friction device being movable circumferentially by said drum, means for moving said friction device against said drum including a rockable wheel cylinder provided with relatively movable abutments operable by fluid under pressure to engage and spread apart said adjacent ends to engage said friction device with said drum and also provided with other abutments rockable with said wheel cylinder for engaging and transmitting thrust from one of said adjacent ends to the other of said adjacent ends, and means for rockably mounting said wheel cylinder.

6. A brake comprising a brake drum, brake shoes within and engageable with said drum, said shoes being movable circumferentially by said drum, wheel cylinders between adjacent ends of said shoes, means rockably supporting each wheel cylinder, each wheel cylinder having abutments operable by fluid under pressure to spread apart the shoe ends engaged by said abutments to engage said shoes with said drum, each wheel cylinder also being provided with other abutments rockable with the wheel cylinder and transmitting thrust from one of the shoe ends engaged by said other abutments to the other of said shoe ends engaged by said other abutments.

7. A brake comprising a brake drum, brake shoes within and engageable with said drum and having adjacent ends, said shoes being movable circumferentially by said drum, means for moving said shoes against said drum including a wheel cylinder between said adjacent ends of said shoes having relatively movable piston-operated abutments engaging said adjacent shoe ends to apply said shoes to said drum, means rockably supporting said wheel cylinder, said wheel cylinder also having other abutments thereon movable with said wheel cylinder and located at its ends and engaging said adjacent shoe ends radially inwardly and radially outwardly of said first mentioned abutments for transmitting thrust from one of said adjacent shoe ends to the other of said adjacent shoe ends.

8. A brake comprising a brake drum, a mounting, a friction device within and engageable with said drum and having adjacent ends, said friction device being movable circumferentially by said drum, means for moving said friction device against said drum including a wheel cylinder rockably mounted on said mounting having relatively movable abutments engaging said ends for moving said friction device against said drum and having other abutments engaging said ends for transmitting thrust from one of said ends to the other, one of said other abutments being adjustable.

9. A brake comprising a brake drum, a mounting, a pair of brake shoes within and engageable with said drum and having adjacent ends, said shoes being movable circumferentially with said drum, wheel cylinders pivotally mounted on said mounting and having relatively movable abutments engaging adjacent ends of said shoes for spreading said adjacent ends apart to move said shoes against said drum, said wheel cylinders having other abutments engaging said adjacent ends for transmitting thrust from one adjacent end to the other upon turning movement of said wheel cylinders about the axes of their pivotal mountings, the axes of pivotal movement of said cylinders being radially inwardly of the lines of force through the points of engagement of said other abutments with said adjacent ends, and said wheel cylinders and their pivotal mountings cooperating with said drum and shoes to anchor said shoes in response to continued turning of said wheel cylinders about their axes of pivotal movement.

10. A brake comprising a brake drum, brake shoes within and engageable with said drum and having adjacent ends, said shoes being movable circumferentially by said drum, means for moving said shoes against said drum including a rockable wheel cylinder between said adjacent ends of said shoes having piston-operated abutments engaging said adjacent shoe ends to apply said shoes to said drum, said wheel cylinder also having other abutments thereon movable with said wheel cylinder and located at its ends and engaging said adjacent shoe ends radially inwardly and radially outwardly of said first mentioned abutments for transmitting thrust from one of said adjacent shoe ends to the other of said adjacent shoe ends, the radially inner of said other abutments which engages one of said adjacent shoe ends comprising a pad having a sliding engagement with said wheel cylinder and having a convex arcuate abutment surface, said one of said adjacent shoe ends having a bearing fitting said convex arcuate abutment surface.

11. A brake comprising a brake drum, brake shoes within and engageable with said drum and having pairs of adjacent shoe ends, said shoes being movable circumferentially by said drum, a thrust transmitting device between and engageable with the shoe ends of each pair, means rockably supporting said devices, one of said devices comprising a wheel cylinder having relatively movable abutments engaging the associated pair of shoe ends for moving the adjacent shoes against said drum and having other abutments fixed relative to each other engaging said last-mentioned shoe ends for transmitting thrust from one of said last-mentioned shoe ends to the other.

References Cited in the file of this patent

UNITED STATES PATENTS

| | | |
|---|---|---|
| 1,660,481 | Down | Feb. 28, 1928 |
| 1,953,258 | Pentz | Apr. 2, 1934 |
| 2,069,831 | Hirschman et al. | Feb. 9, 1937 |
| 2,127,741 | La Brie | Aug. 23, 1938 |
| 2,372,415 | Eksergian | Mar. 27, 1945 |
| 2,400,042 | Goepfrich | May 7, 1946 |

FOREIGN PATENTS

| | | |
|---|---|---|
| 358,555 | Great Britain | Oct. 7, 1931 |